US011663895B1

(12) United States Patent
Marzorati et al.

(10) Patent No.: US 11,663,895 B1
(45) Date of Patent: May 30, 2023

(54) VIRTUAL THREE-DIMENSIONAL HOLOGRAPHIC SAFETY GATE

(71) Applicant: Kyndryl, Inc., New York, NY (US)

(72) Inventors: Mauro Marzorati, Lutz, FL (US); Jeremy R. Fox, Georgetown, TX (US); James Edward Regan, Brookfield, CT (US); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/548,965

(22) Filed: Dec. 13, 2021

(51) Int. Cl.
*G09G 3/00* (2006.01)
*G06F 3/01* (2006.01)
*G08B 21/02* (2006.01)
*G08B 5/22* (2006.01)

(52) U.S. Cl.
CPC .............. *G08B 21/02* (2013.01); *G06F 3/011* (2013.01); *G08B 5/22* (2013.01); *G09G 3/003* (2013.01)

(58) Field of Classification Search
CPC .......... G08B 21/02; G08B 5/22; G09G 3/003; G06F 3/011; G06F 3/016; G06F 3/017; G06F 3/0426; G06F 3/0428; G06F 3/04845; G06T 19/003; H04L 67/131
See application file for complete search history.

(56) References Cited

U.S. PATENT DOCUMENTS

| | | | |
|---|---|---|---|
| 7,974,714 B2 | 7/2011 | Hoffberg | |
| 9,596,451 B2 | 3/2017 | Walter et al. | |
| 9,805,516 B2 * | 10/2017 | Liu | H04N 13/366 |
| 10,049,544 B2 | 8/2018 | Kerzner | |
| 10,228,653 B2 | 3/2019 | Ochiai et al. | |
| 10,445,944 B2 | 10/2019 | Galera et al. | |
| 10,467,885 B2 | 11/2019 | Trundle et al. | |
| 10,832,548 B2 | 11/2020 | Nguyen et al. | |
| 11,040,450 B2 | 6/2021 | Vu et al. | |
| 11,215,823 B2 * | 1/2022 | Li | G03H 1/2205 |
| 11,325,625 B2 * | 5/2022 | Weiner | G06V 20/20 |
| 2017/0092138 A1 | 3/2017 | Trundle et al. | |
| 2020/0368616 A1 * | 11/2020 | Delamont | A63F 13/213 |

(Continued)

FOREIGN PATENT DOCUMENTS

| | | |
|---|---|---|
| CN | 108886601 | 11/2018 |
| KR | 102064182 | 2/2020 |

OTHER PUBLICATIONS

Ackerman, "Using artificial intelligence to generate 3d holograms in real-time", https://news.mit.edu/2021/3d-holograms-vr-0310, MIT News, Massachusetts Institute of Technology, Mar. 10, 2021, 5 pages.

(Continued)

*Primary Examiner* — Vijay Shankar
(74) *Attorney, Agent, or Firm* — Dan Housley; Andrew M. Calderon; Calderon Safran & Cole P.C.

(57) ABSTRACT

A method includes: determining, by a computing device, an operating condition of a machine in an industrial environment; determining, by the computing device, a hazard based on the operating condition; determining, by the computing device, one or more safety precautions based on the hazard; generating, by the computing device, a virtual three-dimensional holographic safety gate around the machine based on the one or more safety precautions.

20 Claims, 5 Drawing Sheets

(56) References Cited

U.S. PATENT DOCUMENTS

2022/0009535 A1* 1/2022 Weiner ................ G07C 5/0808

OTHER PUBLICATIONS

Anonymous, "3D holographic head-up display could improve road safety", https://optics.org/news/12/4/39, Optics.org, Apr. 28, 2021, 3 pages.

Anonymous, "Heliodisplay", https://en.wikipedia.org/wiki/Heliodisplay, Wikipedia, accessed Nov. 14, 2021, 4 pages.

Anonymous, "Fog display", https://en.wikipedia.org/wiki/Fog_display, Wikipedia, accessed Nov. 14, 2021, 1 page.

Anonymous, "Volumetric display", https://en.wikipedia.org/wiki/Volumetric_display, Wikipedia, accessed Nov. 14, 2021, 8 pages.

Wang, "Volumetric Display achieves quality moving 3D images that are better than holograms", https://www.nextbigfuture.com/2018/01/volumetric-display-achieves-quality-moving-3d-images-that-are-better-than-holograms.html, Jan. 2018, 2 pages.

Zhu et al. "A volumetric full-color display realized by frequency upconversion of a transparent composite incorporating dispersed nonlinear optical crystals", www.nature.com/am, NPG Asia Materials (2017) 9, e394; doi:10.1038/am.2017.89, Jun. 30, 2017, 7 pages.

Borenstein, "Better than holograms: A new 3-D projection into thin air", PHYS.ORG, Jan. 24, 2018, 3 pages.

Thompson, "Watch These Spooky Holograms Made With Smoke and Projectors", https://www.popularmechanics.com/technology/gadgets/a25658/spooky-holograms-with-smoke-and-projectors/, accessed Nov. 14, 2021, 1 page.

Lemercier, "No-logram", https://joanielemercier.com/no-logram/, Mar. 8, 2017, 1 page.

Anonymous, "IBM Maximo Application Suite: Mobile EAM", https://www.ibm.com/products/maximo/mobile-eam, accessed Dec. 12, 2021, 11 pages.

"DroneDeploy Helps businesses take off by harnessing the power of drone technology", https://www.ibm.com/case-studies/c848309d42496w67, accessed Dec. 12, 2021, 7 pages.

"Complete Reality Capture Interior and exterior visual data—any altitude, any angle, all in one platform.", https://www.dronedeploy.com/, accessed Dec. 12, 2021, 9 pages.

* cited by examiner

VIRTUAL THREE-DIMENSIONAL HOLOGRAPHIC SAFETY GATE

BACKGROUND

Aspects of the present invention relate generally to safety systems in industrial environments and, more particularly, to a virtual three-dimensional holographic safety gate.

An industrial environment may have plural different machines operating at different locations. Industrial environments may use sensor instrumentation on the machines to determine operating status of the machines for safety purposes. Some machines may be older model machines that have relatively less sensor instrumentation, while some other machines may be newer model machines that have relatively more sensor instrumentation.

SUMMARY

In a first aspect of the invention, there is a computer-implemented method including: determining, by a computing device, an operating condition of a machine in an industrial environment; determining, by the computing device, a hazard based on the operating condition; determining, by the computing device, one or more safety precautions based on the hazard; generating, by the computing device, a virtual three-dimensional holographic safety gate around the machine based on the one or more safety precautions.

In another aspect of the invention, there is a computer program product including one or more computer readable storage media having program instructions collectively stored on the one or more computer readable storage media. The program instructions are executable to: determine an operating condition of a machine in an industrial environment; determine a hazard based on the operating condition; determine one or more safety precautions based on the hazard; generate a virtual three-dimensional holographic safety gate around the machine based on the one or more safety precautions, wherein the generating the virtual three-dimensional holographic safety gate comprises sending instructions to plural projection units that project the virtual three-dimensional holographic safety gate.

In another aspect of the invention, there is system including a processor, a computer readable memory, one or more computer readable storage media, and program instructions collectively stored on the one or more computer readable storage media. The program instructions are executable to: determine an operating condition of a machine in an industrial environment; determine a hazard based on the operating condition; determine one or more safety precautions based on the hazard; generate a virtual three-dimensional holographic safety gate around the machine based on the one or more safety precautions, wherein the generating the virtual three-dimensional holographic safety gate comprises sending instructions to plural projection units that project the virtual three-dimensional holographic safety gate.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to safety systems in industrial environments and, more particularly, to a virtual three-dimensional holographic safety gate. In an industrial environment such as on an industrial floor, there can be many situations that pose a safety risk to people in the environment. For example, working with a properly running machine may be hazardous if not done with certain safety equipment and/or from a certain area. As another example, malfunctioning machines may pose a hazard. As yet another example, moving material from one location to another can create a hazard, e.g., in the case of dropped material, a spill, etc. People in the environment may not be aware of all the hazards, and this poses a safety risk to those people. Aspects of the invention address this problem by projecting holographic safety gates in areas of the industrial environment. In embodiments, the holographic safety gates are customized based on the hazard posed by a particular machine or material movement. In embodiments, the holographic safety gates define an area around a machine or a path of travel of material movement, and display what particular safety equipment is required to be within the defined area. In embodiments, the holographic safety gates are ephemeral and created dynamically using moveable projectors located near or around the machine or a path of travel of material movement. In embodiments, the moveable projectors move under their own power to locations instructed by a central management system and then cooperate with one another (e.g., coordinate their respective projections relative to one another) to create the holographic safety gates.

In accordance with in aspect of the invention, there is a method for rendering a holographic safety gate, comprising: identifying a number of unique machines/zones in an environment, wherein each machine has an associated safety profile that indicates proper procedures/PPE (personal protective equipment) required to be in the vicinity of the machine during various operations, and potential safety hazards/accidents that may occur; monitoring activity of the machine and human activity around the machine; generating for each machine, and based on the safety profile and/or a safety policy a holographic safety gate at a identified location, wherein the safety gate is generated by one or more holographic projection molecules, wherein the one or more holographic projection modules are selected based on size of the area, predicted time the gate will be projected, location, etc. In embodiments, the holographic projection modules are incorporated into and/or attached to devices such as light bulbs, machines, individual units, cameras, and the like, and the holographic projection modules are portable and can temporarily attach to locations (e.g., magnets, hooks, etc.). In embodiments, the monitoring includes identifying a set of PPE required to be within a proximity (can be the same or different as the safety gate location), wherein each unit of PPE includes an IoT (Internet of Things) device and is connected to an IoT network. In embodiments, the method includes indicating (e.g., nose, light, etc.) a violation of the safety policy based on the monitored activity and/or the monitored PPE. Embodiments also include a system that performs the method.

Aspects of the invention change the physical state of an industrial environment by ephemerally and dynamically projecting a hologram that is visible to people in the environment. Aspects of the invention have the practical application of ephemerally and dynamically projecting a hologram that defines a safety space around a hazard, thereby using a technical solution to increase safety of people in an industrial environment.

Implementations of the invention provide holographic gate rendering. In embodiments, a system utilizes external sensors, camera-based systems, various scanning modules, etc., to analyze activity (e.g., machine operation and/or material movement) and contextual need in an industrial floor. In embodiments, based on this analysis, the system determines a number of holographic projection modules and positions of the modules to project a visual safety boundary within the industrial environment so that people in the industrial environment can take actions to reduce risk associated with hazards in the industrial environment.

Implementations of the invention utilize configuration of protocols for rendering. In embodiments, based on a predicted or planned mobile activity's directions and/or a path of people in the industrial floor, the system proactively evaluates a level of security and safety for the people to perform mobile activity in the said direction and/or path. In embodiments, based on this, the system creating an appropriate three-dimensional holographic projection in the surrounding to show the level of safety.

Implementations of the invention promote proper user adherence to safety protocols. In embodiments, based on the evaluation of the safety surrounding, the system projects a virtual three-dimensional holographic safety gate that visually displays what precautions should be taken by a person when entering an area defined by the virtual three-dimensional holographic safety gate. The system may also show an alert on the virtual three-dimensional holographic safety gate.

Implementations of the invention provide for alert generation and progressive urgency alerting. In embodiments, the dynamically placed holographic projection modules have various sensors to evaluate the level of precaution taken by a person entering the area defined by the virtual three-dimensional holographic safety gate. In embodiments, based on the recommended level of precaution and the detected actual level of precaution of the person entering the area, the system may generate an alert to notify the person that they do not satisfy the recommended level of precaution. In embodiments, levels of precaution are defined by different items of safety gear (e.g., PPE) worn by a person when entering the area defined by the virtual three-dimensional holographic safety gate. In embodiments, the system may project plural safety gates for a single hazard, with an outer safety gate having a relatively lower level of urgency and in inner safety gate having a relatively higher level of urgency.

Implementations of the invention are configured to adapt to different definitions of alerts and/or what constitutes an alert. In embodiments, the system identifies types and levels of safety requirements in the industrial environment. In embodiments, based on this identification, the system creates appropriate virtual three-dimensional holographic safety gates at different locations and different times. In this manner, the system dynamically repositions the virtual three-dimensional holographic safety gates in the surrounding on an as-needed basis. In embodiments, the safety gates are generated dynamically in the sense that they are generated differently (e.g., different location, size, shape, PPE requirements, etc.) for different situations in the industrial environment. In embodiments, the safety gates are generated ephemerally in the sense that they are projected temporarily.

Implementations of the invention are configured to generate guidance that matches a boundary. In embodiments, based on a level of safety requirement, the system creates appropriate types of virtual three-dimensional holographic safety gates and the associated guidance so that people can follow the appropriate guidance to perform an activity in the area defined by the virtual three-dimensional holographic safety gate.

Implementations of the invention provide for buffer zone monitoring and observation. In embodiments, the system integrates historical safety events with current sensor observations to conduct safety evaluations.

According to aspects of the invention, in an industrial environment (e.g., machine shopfloor or activity surrounding), each and every machine is identified uniquely. The machines may share their health status to a central management system (e.g., a centralized computing system). Additionally, or alternatively, various external cameras or other sensors identify the health status of the machines. In embodiments, the system analyzes the external sensor and camera feeds and/or the machine generated feeds to identify if any accident situation is predicted. In embodiments, the system considers historically captured various accident scenarios when predicting an accident situation. In embodiments, based on the analyzed feed, the system identifies what types of accident scenarios can happen for a particular machine or area in the industrial environment. In embodiments, based on the identified types of accident scenarios, the system identifies a level of severity associated with an identified type of accident scenario. In embodiments, the system considers a policy that defines safety precautions to be taken for various levels of severity and, based on the policy, identifies what one or more precautions to be taken to perform an activity (e.g., enter an area). In embodiments, based on the severity associated with the type of accident scenario, and with using historical learning and the policy, the system identifies a location where the safety gate will be created (e.g., projected).

In embodiments, the system includes multiple mobile or static holographic projection modules, each type of which may be wired or wireless. The holographic projection modules can be self-moving, such as powered wheeled units hanging from an overhead gantry, for example. The holographic projection modules can be mounted on any structure at various locations around the industrial environment. The holographic projection modules can be temporarily attached to structures via hooks or magnets, for example, at appropriate locations above the area to be covered. In embodiments, the holographic projection modules have light emitters with a certain amount of articulation, such that the light emitters can sweep an arc of semi-spherical volume around them. In embodiments, based on the identified types of accidental situation, severity of the accidental situation, and precaution required to perform activity in the said surrounding, the system identifies how to create a virtual three-dimensional holographic safety gate around an area including a number of holographic projection modules and locations of the holographic projection modules needed to project the virtual three-dimensional holographic safety gate. In embodiments, the holographic projection modules cooperate with one another to create the virtual three-dimensional holographic safety gate, e.g., by using their respective light emitters to project respective portions of the virtual three-dimensional holographic safety gate that combine to form the whole the virtual three-dimensional holographic safety gate.

In embodiments, the system uses a placement and choice algorithm to determine a proper selection of holographic projection module type based not only location, but also expected length of time for the safety gate. For example, a first type of holographic projection module may have a longer battery life than a second type of holographic projection module, and the system may choose the first type for a safety gate that is determined to be projected for a time that exceeds the time of battery life of the second type. In embodiments, each holographic projection module obtains (e.g., receives) information from the central management system, the information defining a location for the holographic projection module, content to be projected by the holographic projection module, and a location (e.g., direction) in which to project the content.

In embodiments, while projecting the virtual three-dimensional holographic safety gate, the system identifies a content of the area. For example, the system may determine if people are currently present in the area virtual three-dimensional holographic safety gate, if people need to enter the area virtual three-dimensional holographic safety gate, etc.

In embodiments, the system identifies a path of travel associated with a mobile activity, e.g., material movement within the industrial environment. In embodiments, based on the path of travel, the system identifies a mobility path of people within the industrial environment. In embodiments, based on the mobility path, the system controls the holographic projection modules to create a holographic boundary around the mobility path, thus visually defining an area where people will perform mobile activity.

In embodiments, the virtual three-dimensional holographic safety gate includes a visual display of what types of precautions should be used when entering the area defined by the virtual three-dimensional holographic safety gate. For example, the virtual three-dimensional holographic safety gate may include text and/or pictures that are visible to people and that indicate what PPE is needed to enter the area. In embodiments, the PPE of users in the industrial environment is IoT enabled such that it can be detected by the system. For example, gloves, safety belts, safety glasses, safety shoes, etc., may be equipped with IoT sensors that communicate with the system. In this manner, the system may determine whether a person in the area defied by the virtual three-dimensional holographic safety gate is wearing the recommended PPE for this area. In embodiments, in response to determining that a person in the area defied by the virtual three-dimensional holographic safety gate is not wearing the recommended PPE for this area, the system generates an alert to notify the person and/or other people of the safety risk.

It should be understood that, to the extent implementations of the invention collect, store, or employ personal information provided by, or obtained from, individuals (for example, user profile information, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
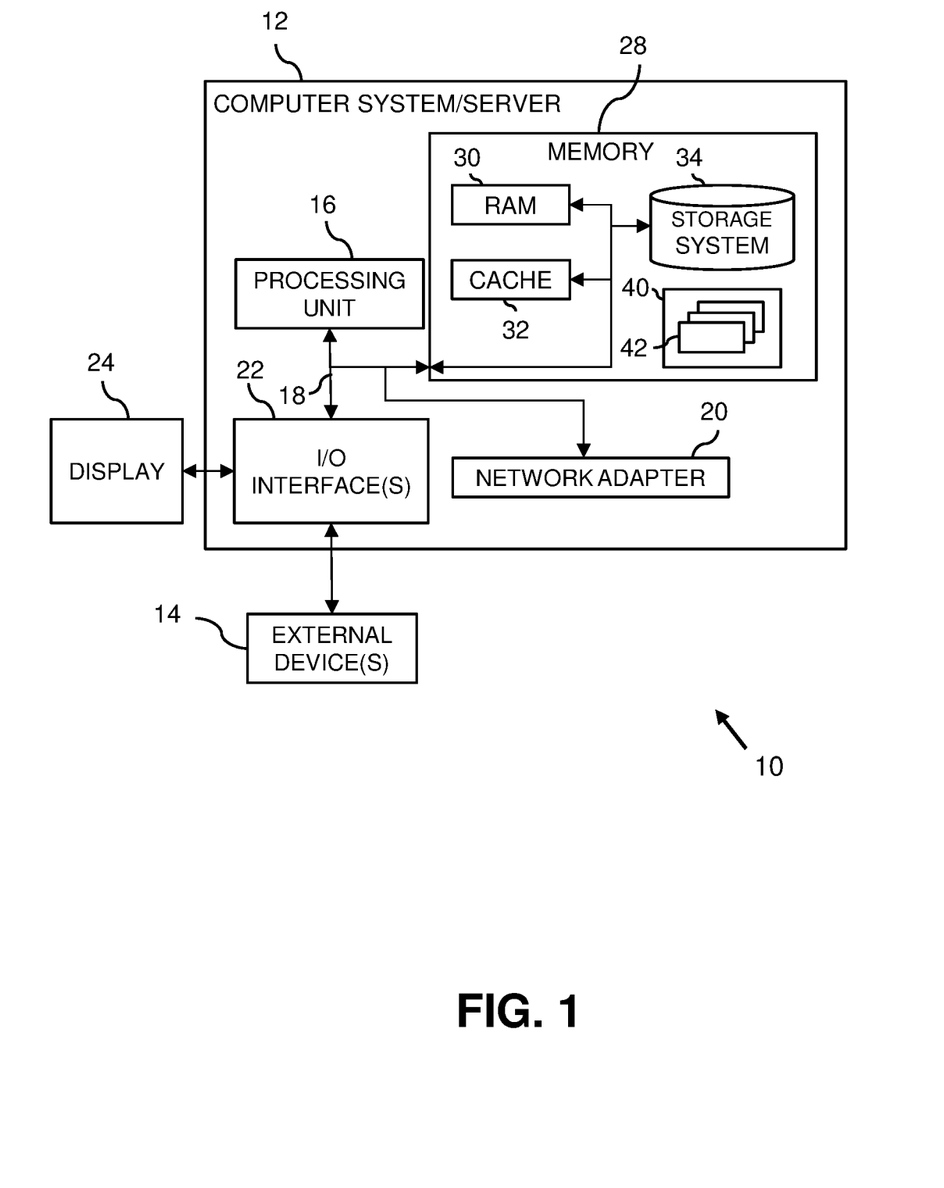
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
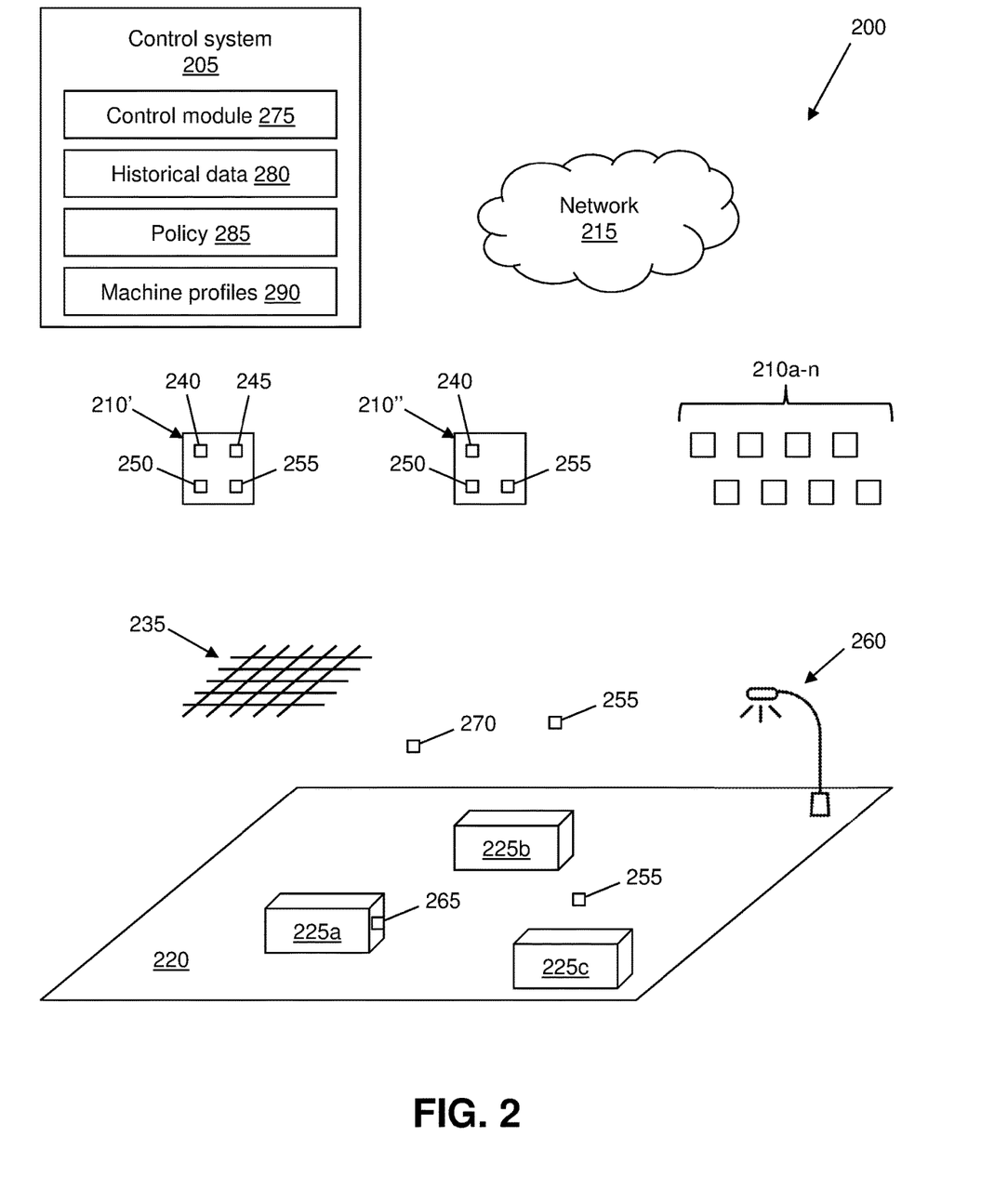
FIG. 2 shows a block diagram of an exemplary environment in accordance with aspects of the invention.

FIG. 2 shows a block diagram of an exemplary environment 200 in accordance with aspects of the invention. In embodiments, the environment 200 includes a control system 205 that communicates with plural projection units 210a-n via a network 215. In embodiments, the environment 200 is an industrial environment including a floor 220 and at least one machine 225a. There may be other machines 225b, 225c and still others not shown in FIG. 2.

The control system 205 may be a computing device and may include one or more elements of computer system 12. The network 215 is a communication network and may include one or more of a LAN, WAN, and the Internet, and various combinations thereof. Each of the projection units 210a-n is a device that includes at least a light emitter, such as a laser or LED, that is configured to emit light that is used to project a holographic display or a portion of a holographic display. Different types of light emitters may be used for different types of holographic technologies.

Individual ones of the projection units 210a-n are either a mobile unit or a static unit. Mobile units may move under their own power within the environment 200, e.g., using wheels, tracks, magnets, etc. For example, the environment 200 may include an overhead track system 235 (e.g., on or near a ceiling), and mobile units may move along the track system 235 under their own power to reposition themselves at different locations within the environment 200. Mobile units may use propulsion system for moving with the environment, such as motorized drive wheel, magnetic propulsion systems, pneumatic propulsion systems, etc. An example of a mobile unit is shown at element 210' which includes a light emitter 240 and a propulsion system 245. A mobile unit 210' may optionally include an attachment structure 250 and/or a particle emitter 255 as descried herein.

Static units may be non-movably attached to a structure within the environment 200, e.g., such as a post, light fixture, wall, ceiling, etc., such that these units do not move under their own power within the environment 200. For example, a static unit may be attached to a light fixture 260 as shown in FIG. 2. Static units may be provided with an attachment structure 250, which may include at least one of a hook, magnet, and clamp for affixing the static units to structures within the environment. An example of a static unit is shown at element 210" which includes a light emitter 240 and attachment structure 250. A static unit 210" may optionally include a particle emitter 255 as descried herein. A static unit 210" may also be connected to the track system 235, e.g., via hooks, magnets, or clamps as described herein.

According to aspects of the invention, the control system 205 provides instructions to some or all of the projection units 210a-n via the network 215 for the purpose of causing the instructed projection units 210a-n to project a virtual three-dimensional holographic safety gate in the environment 200. Any suitable holographic technology may be used with the some or all of the projection units 210a-n being the light emitting elements of the holographic technology. In one example, the system uses volumetric display technology that projects a visual three-dimensional display in free space without using screens or mirrors. One volumetric display technology uses fine particles of water (e.g., fog) suspended in air and plural light emitters. For instance, a fog display using multiple projectors can render a three-dimensional image in a volume of space, resulting in a static-volume volumetric display. Other particles suspended in air can used for a medium for a volumetric display, such as smoke or certain ionized elements. In embodiments, particle emitters 255 may be provided at various locations throughout the environment 200 to emit particles that provide a medium on which to project the volumetric display that is used the virtual three-dimensional holographic safety gate in implementation of the invention. For example, particle emitters 255 may be included in each of the projection units 210a-n, at locations in the floor 220, at locations in the ceiling, and other locations within the environment 200. In this manner, the system may control the particle emitters 255 to emit particles (e.g., water, smoke, certain ionized elements) that form a medium onto which the projection units 210a-n emit light to form a virtual three-dimensional holographic safety gate. Although volumetric display is used herein for illustration of aspects of the invention, implementations are not limited to volumetric display and instead other holographic technology may be used with the projection units 210a-n to create the virtual three-dimensional holographic safety gate.

In embodiments, each machine 225a, 225b, 225c, etc., is uniquely identified using a respective machine profile that defines different operating conditions and safety data associated with each operating condition. Operating conditions of a machine may be determined by sensors in the environment, including one or more sensors 265 in or on the machine and one or more sensors 270 around the machine. Each machine profile may include data defining ranges of sensor values that correspond to different operating conditions of the machine. In this manner, the control system 205 may determine the operating condition of any machine based on senor data of that machine and the machine profile of that machine. In embodiments, the machine profile for a machine defines one or more hazards associated with each different operating condition, and one or more safety precautions defined for each hazard. Safety precautions for each hazard may alternatively be defined in a policy 285. Hazards may include, for example and without limitation, excessive noise, excessive temperatures, caustic substances, etc. Safety precautions may include for example and without limitation, a defined area around the machine to avoid when not wearing specified PPE, and specified PPE to wear when in the defined area around the machine. Different safety precautions may be defined for different hazards, such that a particular machine may have first safety precautions based on a first operating condition of the machine and second safety precautions based on a second operating condition of the machine, where the first safety precautions differ from the second safety precautions.

With continued reference to FIG. 2, a number of particle emitters 255 and sensors 265, 270 are shown in the environment for illustration. The system may include any number of particle emitters 255, sensors 265, and sensors 270 at any desired locations within the environment 200. Each of the particle emitters 255, sensors 265, and sensors 270 may be operatively connected to the control system 205 via the network 215. In this way, the control system 205 can receive data from the sensors 265, 270 and provide control instructions to the particle emitters 255.

In embodiments, the control system 205 comprises a control module 275, which may comprise one or more program modules such as program modules 42 described with respect to FIG. 1. The control system 205 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

According to aspects of the invention, in the industrial environment 200 (e.g., machine shopfloor or activity surrounding), each and every machine 225a, 225b, 225c is identified uniquely. The machines may share their health status to the control system 205 via the network 215. Additionally, or alternatively, various external cameras or other sensors 270 identify the health status of the machines. In embodiments, the control system 205 analyzes the external sensor and camera feeds and/or the machine generated feeds to identify if any accident situation is predicted. In embodiments, the control system 205 considers historically captured various accident scenarios (e.g., stored in historical data 280) when predicting an accident situation. In embodiments, based on the analyzed feed, the control system 205 identifies what types of accident scenarios can happen for a particular machine or area in the industrial environment. In embodiments, based on the identified types of accident scenarios, the control system 205 identifies a level of severity associated with an identified type of accident scenario. In embodiments, the control system 205 considers a policy 285 that defines safety precautions to be taken for various levels of severity and, based on the policy, identifies what one or more precautions to be taken to perform an activity (e.g., enter an area). In embodiments, based on the severity associated with the type of accident scenario, and with using historical data 280 and the policy 285, the control system 205 identifies a location where the safety gate will be created (e.g., projected).

In embodiments, the environment 200 includes multiple mobile or static holographic projection modules (e.g., projection units 210a-n), each type of which maybe wired or wireless. The holographic projection modules can be self-moving, such as powered wheeled units hanging from an overhead gantry, for example. The holographic projection modules can be mounted on any structure at various locations around the industrial environment. The holographic projection modules can be temporarily attached to structures via hooks or magnets, for example, at appropriate locations above the area to be covered. In embodiments, the holographic projection modules have light emitters with a certain amount of articulation, such that the light emitters can sweep an arc of semi-spherical volume around them. In embodiments, based on the identified types of accidental situation, severity of the accidental situation, and precaution required to perform activity in the said surrounding, the control system 205 identifies how to create a virtual three-dimensional holographic safety gate around an area including a number of holographic projection modules and locations of the holographic projection modules needed to project the virtual three-dimensional holographic safety gate. In embodiments, the holographic projection modules cooperate with one another to create the virtual three-dimensional holographic safety gate, e.g., by using their respective light emitters to project respective portions of the virtual three-dimensional holographic safety gate that combine to form the whole the virtual three-dimensional holographic safety gate.

In embodiments, the control system 205 uses a placement and choice algorithm (e.g., programmed in control module 275) to determine a proper selection of holographic projection module type based not only location, but also expected length of time for the safety gate. For example, a first type of holographic projection module may have a longer battery life than a second type of holographic projection module, and the system may choose the first type for a safety gate that is determined to be projected for a time that exceeds the time of battery life of the second type. In embodiments, each holographic projection module obtains (e.g., receives) information from the control system 205, the information defining a location for the holographic projection module, content to be projected by the holographic projection module, and a location (e.g., direction) in which to project the content.

In embodiments, while projecting the virtual three-dimensional holographic safety gate, the control system 205 identifies a content of the area. For example, the control system 205 may determine if people are currently present in the area of the virtual three-dimensional holographic safety gate, if people need to enter the area virtual three-dimensional holographic safety gate, etc.

In embodiments, the control system 205 identifies a path of travel associated with a mobile activity, e.g., material movement within the industrial environment. In embodiments, based on the path of travel, the control system 205 identifies a mobility path of people within the industrial environment. In embodiments, based on the mobility path, the control system 205 controls the holographic projection modules to create a holographic boundary around the mobility path, thus visually defining an area where people will perform mobile activity.

In embodiments, the virtual three-dimensional holographic safety gate includes a visual display of what types of precautions should be used when entering the area defined by the virtual three-dimensional holographic safety gate. For example, the virtual three-dimensional holographic safety gate may include text and/or pictures that are visible to people and that indicate what PPE is needed to enter the area. In embodiments, the PPE of users in the industrial environment is IoT enabled such that it can be detected by the system. For example, gloves, safety belts, safety glasses, safety shoes, etc., may be equipped with IoT sensors that communicate with the system. In this manner, the control system 205 may determine whether a person in the area defied by the virtual three-dimensional holographic safety gate is wearing the recommended PPE for this area. In embodiments, in response to determining that a person in the area defied by the virtual three-dimensional holographic safety gate is not wearing the recommended PPE for this area, the control system 205 generates an alert to notify the person and/or other people of the safety risk.

Figure 3:
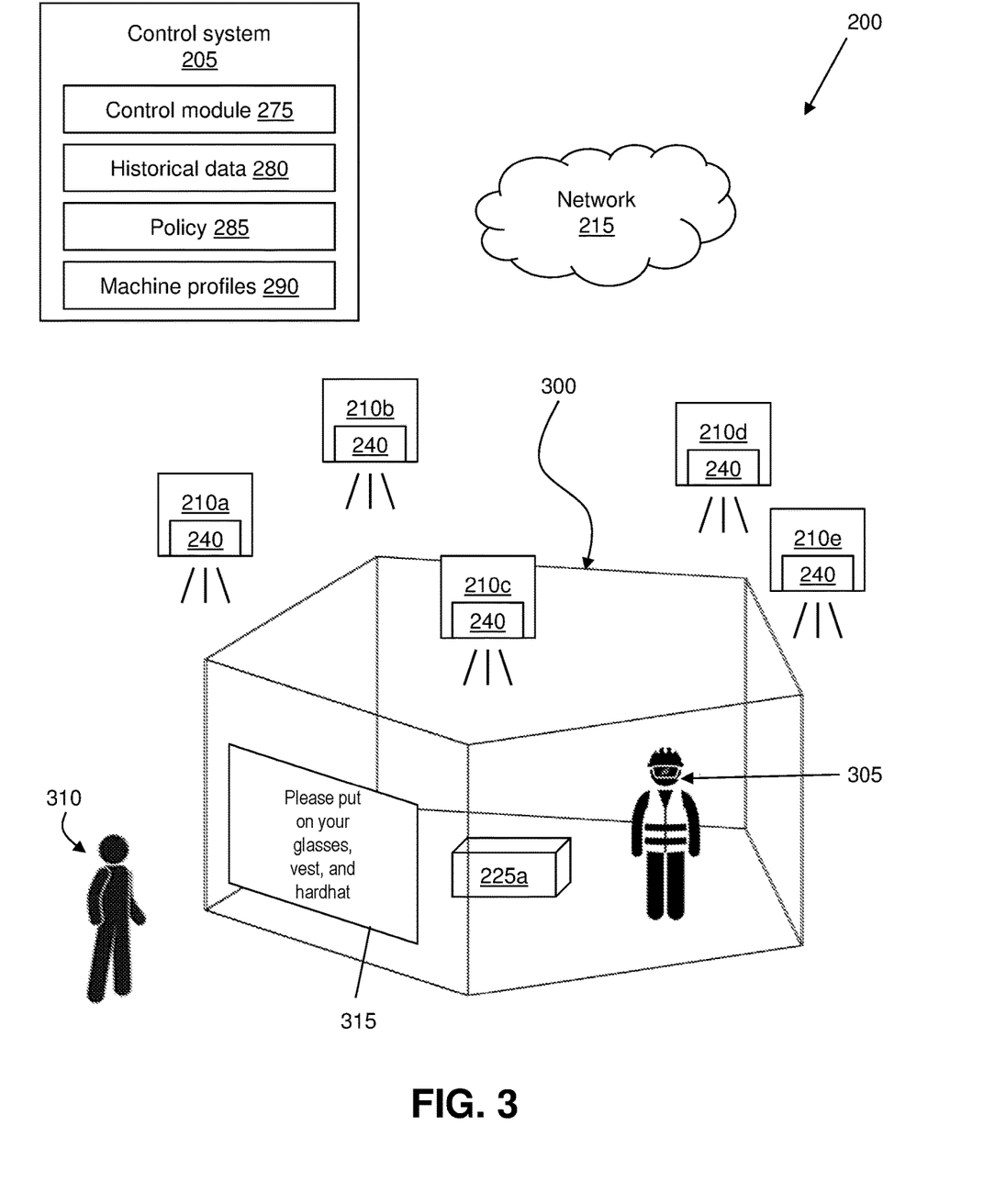
FIGS. 3 and 4 show an example use case in accordance with aspects of the invention.

FIG. 3 shows an example of a virtual three-dimensional holographic safety gate 300 in accordance with aspects of the invention. In the example shown in FIG. 3, the control system 205 determines a hazard associated with machine 225a. As described with respect to FIG. 2, the control system 205 may determine the hazard based on data from sensor(s) 265 and/or sensor(s) 270 and machine profiles 290. For example, using the data from the sensors 265/270 and the machine profile 290 for this machine 225a, the control system 205 may determine an operating condition of the machine 225a and a hazard defined for this operating condition. Based on the determined hazard, the control system 205 may use the machine profile 290 for this machine 225a and/or the policy 285 to determine one or more safety precautions defined for the hazard. In response to determining the one or more safety precautions, the control system 205 determines the size and location of a virtual three-dimensional holographic safety gate 300 around the machine 225a, a number of projection units 210a-e required to create the determined virtual three-dimensional holographic safety gate 300, locations of the projection units 210a-e, and content for each of the projection units 210a-e to display. In embodiments, the control module 275 makes these determinations based on historical data 280, locations of the static units, available locations of the mobile units, and using the encoded placement and choice algorithm. For static units that are included in the determined modules (e.g., similar to static unit 210"), the control system 205 sends instructions to these units via the network 215, the instructions telling these units what content to project. For dynamic units that are included in the determined modules (e.g., similar to unit 210'), the control system 205 sends instructions to these units via the network 215, the instructions telling these units where to go (e.g., relative to the machine 225a) and what content to project.

With continued refence to FIG. 3, in response to receiving instructions from the control system 205, the determined projection units 210a-e use their respective light emitters 240 to create the virtual three-dimensional holographic safety gate 300 around the machine 225a. In the example of a volumetric display, the control system 205 may also send control signals to particle emitters 255 in the determined area of the virtual three-dimensional holographic safety gate 300 to emit particles (e.g., water vapor) to produce the volumetric display.

In embodiments, and as described with respect to FIG. 2, the virtual three-dimensional holographic safety gate 300 may include a visual representation of the safety precautions that are required (or suggested) for entering the area inside the virtual three-dimensional holographic safety gate 300. In the example of FIG. 3, the virtual three-dimensional holographic safety gate 300 includes a representation 305 that shows a safety vest, safety glasses, and a hardhat. This representation 305 may be part of the content that is projected by the projection units 210a-e as part of the virtual three-dimensional holographic safety gate 300.

FIG. 3 also shows an example of a person 310 outside the area defined by the virtual three-dimensional holographic safety gate 300. In embodiments, the system monitors the location and movement of people in the industrial environment for safety reasons. The monitoring can be performed using cameras and/or IoT sensors (e.g., sensors carried by the person). In accordance with aspects of the invention, the system determines based on the monitoring the location of this person 310 that the person is walking toward the area defined by the virtual three-dimensional holographic safety gate 300. In response to this determination, the system determines whether this person 310 complies with the safety precautions required (or suggested) for entering the area. In embodiments, and as described with respect to FIG. 2, safety equipment in the environment, e.g., PPE such as safety vest, safety glasses, safety shoes, hardhat, etc., is equipped with an IoT sensor that communicates with the control system 205 via the network 215. The IoT sensor data can include real time location of each individual item of safety equipment in the environment. Based on this IoT sensor data, the control system 205 determines whether the person 310 has the safety precautions, e.g., a safety vest, safety glasses, and a hardhat in this example, required (or suggested) for entering the area defined by the virtual three-dimensional holographic safety gate 300. In this example, the control system 205 determines that the person 310 does not have any of the safety vest, safety glasses, and a hardhat. In response to this determination, the control system 205 sends instructions to a subset of the projection units 210a-e to alter the display of the virtual three-dimensional holographic safety gate 300 that is facing the person 310. In embodiments, the alteration is to add a warning 315 that is visible to the person based on the person's location relative to the virtual three-dimensional holographic safety gate 300. In embodiments, the warning 315 tells this particular person 310 what safety precautions they should take before entering the area. In implementations, the warning 315 may be different for different people based on what safety precautions they have and don't have when approaching the area.

Still referring to the example of FIG. 3, in embodiments if the person 310 enters the area defined by the virtual three-dimensional holographic safety gate 300 without the safety precautions, then the system generates an alert. As described herein, in embodiments the system monitors the location and movement of the person 310 and also monitors what safety equipment this person 310 has with them. In the event the system determines the person's location is within the area defined by the virtual three-dimensional holographic safety gate 300 concurrently with determining the person does not have all the safety precautions for this area, then the system generates an alert to indicate the unsafe condition to the person 310 and/or other people. The alert can be a visual and/or audible alert directed to the person. For example, the control system 205 can turn on a flashing light in the area of the person 310 and/or play a message over a loudspeaker in the area of the person. Additionally, the control system 205 may send an alert to a user device such as a smartphone or tablet computer carried by the person 310, or a smartphone, tablet computer, laptop computer, or desktop computer of another person (e.g., an environment safety monitor). In this manner, the system may warn the person 310 and other people of the unsafe condition that the person 310 is in.

Figure 4:
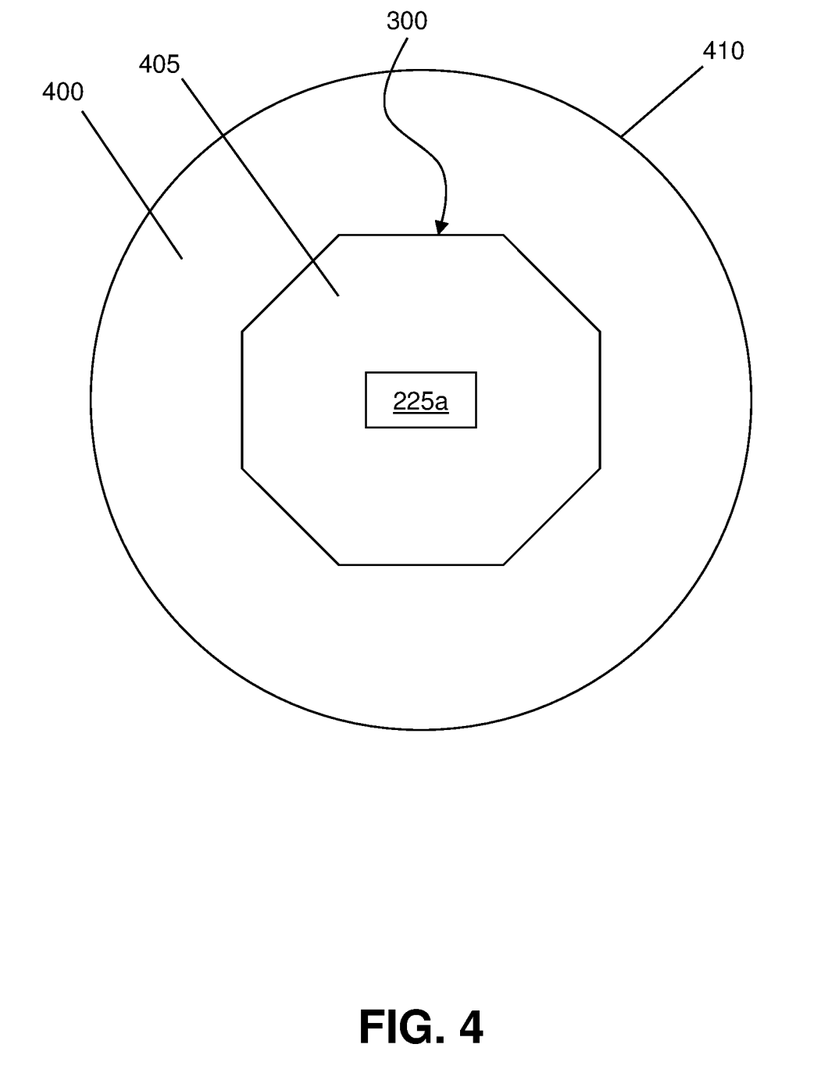

FIG. 4 shows an example of a buffer zone in accordance with aspects of the invention in furtherance of the example shown in FIG. 3. FIG. 4 shows a top-down view of the environment 200 including the area 405 defined by the virtual three-dimensional holographic safety gate 300. In embodiments, the control system 205 defines a buffer zone 400 around and outside of the virtual three-dimensional holographic safety gate 300. As described herein, the control system 205 may be configured, for safety reasons, to monitor the real time location and movement of all people in the industrial environment. In embodiments, the control system 205 conserves resources by turning off the virtual three-dimensional holographic safety gate 300 in response to determining that there are no people in either the area 405 defined by the virtual three-dimensional holographic safety gate 300 or the buffer zone 400. Instructing the projection units 210a-e to turn off (e.g., stop projecting) the virtual three-dimensional holographic safety gate 300 saves resources (e.g., battery power, supply of particles to be emitted, etc.) when there are no people in the area 405 or the buffer zone 400. In embodiments, when the virtual three-dimensional holographic safety gate 300 is tuned off in this manner, the control system 205 monitors the location of movement of people relative to the buffer zone 400 and, in response to detecting that a person enters the buffer zone 400 the control system instructs the projection units 210a-e to turn on (e.g., start projecting) the virtual three-dimensional holographic safety gate 300 again. In this manner, the system only displays the virtual three-dimensional holographic safety gate 300 on an as-needed basis as dictated by the presence of one or more people in the area 405 or the buffer zone 400. The buffer zone may be defined by a boundary 410 that is located a configurable distance outside of the virtual three-dimensional holographic safety gate 300.

Figure 5:
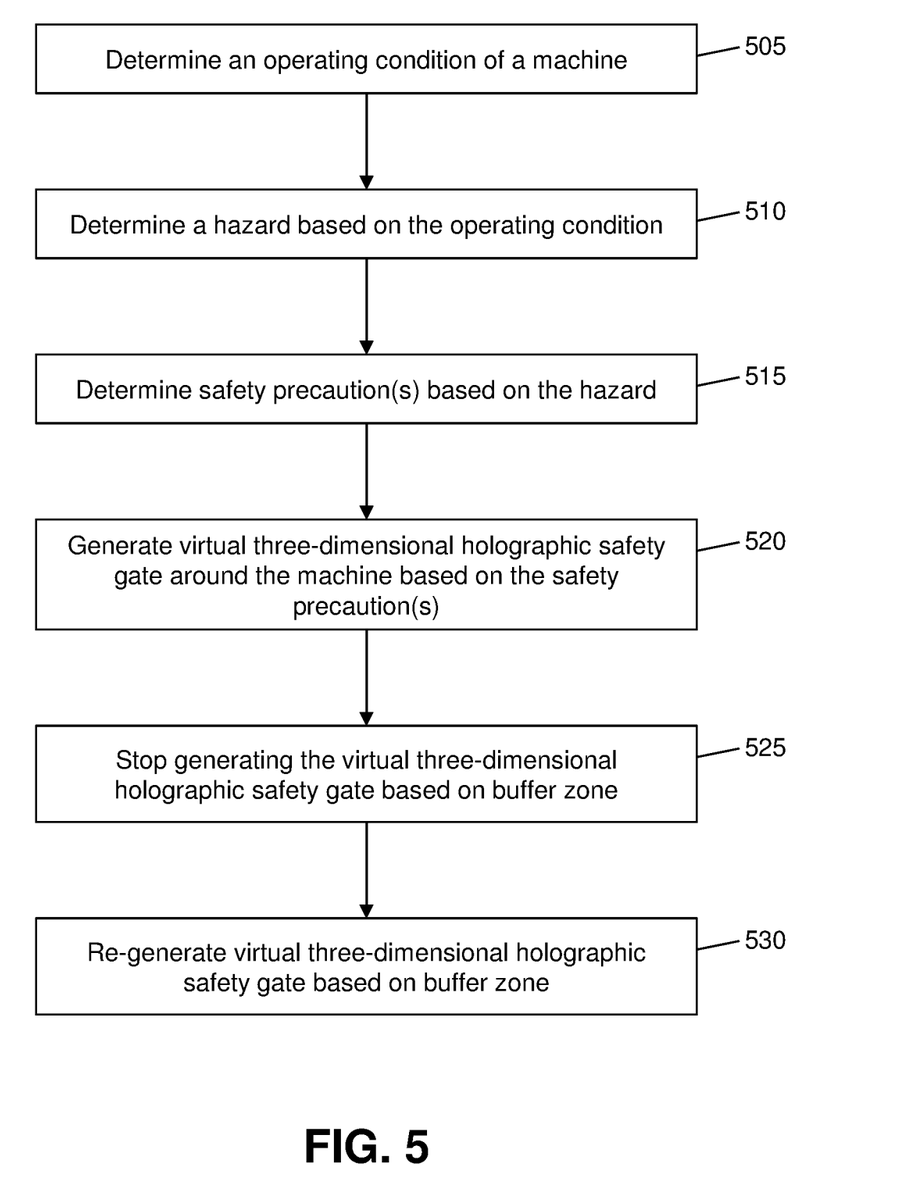
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 2 and are described with reference to elements depicted in FIGS. 2-4.

At step 505, the system determines an operating condition of a machine. In embodiments, and as described with respect to FIG. 2, the control system 205 determines an operating condition of machine 225a based on data from sensor(s) 265 and/or sensor(s) 270 in conjunction with the machine profiles 290. As described herein, the machine profile may define various operating conditions associated with various patterns of sensor data. The sensor data and operating conditions in the machine profile may be based on historical data for this particular machine. In this manner, the machine profile of each individual machine may be tailored to that particular machine.

At step 510, the system determines a hazard based on the operating condition. In embodiments, and as described with respect to FIG. 2, the control system 205 determines a hazard associated with the machine 225a based on the determined operating condition of machine 225a (from step 505) and the machine profiles 290. As described herein, the machine profile may define various hazards associated with various operating conditions for this machine. The hazards and operating conditions in the machine profile may be based on historical data for this particular machine. In this manner, the machine profile of each individual machine may be tailored to that particular machine.

At step 515, the system determines one or more safety precautions based on the hazard. In embodiments, and as described with respect to FIG. 2, the control system 205 determines one or more safety precautions based on the hazard (from step 510) and the machine profiles 290 (or alternatively the policy 285).

At step 520, the system generates a virtual three-dimensional holographic safety gate around the machine based on the safety precaution(s). In embodiments, and as described with respect to FIGS. 2 and 3, the control system 205 sends instructions to projection units 210a-n, wherein the instructions cause the projection units 210a-n to project a virtual three-dimensional holographic safety gate 300 around the machine 225a. In embodiments, a subset of the projection units 210a-n are mobile units 210', and the instructions include instructions for each of the mobile units to move to a respective location and arrive at the respective location by or before an indicated time. The indicated time may be set by the control system 205. In this manner, different ones of the mobile units may autonomously move at different speeds (including starting and stopping and restarting again) on their individual journey to their respective location, but they are instructed to all arrive at their respective locations by the same indicated time in order to start the coordinated effort to display the virtual three-dimensional holographic safety gate 300.

At step 525, the system stops generating the virtual three-dimensional holographic safety gate based on a buffer zone. In embodiments, and as described with respect to FIGS. 2 and 4, in response to the control system 205 detecting that no people are within the buffer zone 400 or the area 405, the control system 205 sends instructions to projection units 210a-n that cause the projection units to stop projecting the virtual three-dimensional holographic safety gate 300 around the machine 225a.

At step 530, the system re-generates the virtual three-dimensional holographic safety gate based on a buffer zone. In embodiments, and as described with respect to FIGS. 2 and 4, in response to the control system 205 detecting that a person has entered the buffer zone 400, the control system 205 sends instructions to projection units 210a-n that cause the projection units to start projecting the virtual three-dimensional holographic safety gate 300 around the machine 225a.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a processor, a computer readable memory, one or more computer readable storage media, and program instructions collectively stored on the one or more computer readable storage media, the program instructions executable to:
determine an operating condition of a machine in an industrial environment;
determine a hazard based on the operating condition;
determine one or more safety precautions based on the hazard; and
generate a virtual three-dimensional holographic safety gate in free space around the machine based on the one or more safety precautions, wherein the generating the virtual three-dimensional holographic safety gate comprises sending instructions to plural projection units that project the virtual three-dimensional holographic safety gate.

2. The system of claim 1, wherein:
a subset of the plural projection units are mobile units, and the instructions include instructions that cause each of the mobile units to move to a respective location and arrive at the respective location by or before an indicated time; and
each of the mobile units move under their own power to the respective location.

3. The system of claim 1, wherein the virtual three-dimensional holographic safety gate includes a visual indication of the one or more safety precautions.

4. The system of claim 3, wherein the program instructions are executable to:
in response to determining a person approaching the virtual three-dimensional holographic safety gate does not have at least one of the one or more safety precautions, cause the virtual three-dimensional holographic safety gate to display a warning to the person, the warning indicating which of the one or more safety precautions the person is lacking.

5. The system of claim 4, wherein the program instructions are executable to:
in response to detecting the person entered an area defined by the virtual three-dimensional holographic safety gate, generate an alert.

6. The system of claim 1, wherein the program instructions are executable to:
define a buffer zone around an area defined by the virtual three-dimensional holographic safety gate;
stop generating the virtual three-dimensional holographic safety gate in response to determining that no people are within the area and the buffer zone; and
regenerate the virtual three-dimensional holographic safety gate in response to determining that a person entered the buffer zone.

7. A computer program product comprising one or more computer readable storage media having program instructions collectively stored on the one or more computer readable storage media, the program instructions executable to:
determine an operating condition of a machine in an industrial environment;
determine a hazard based on the operating condition;
determine one or more safety precautions based on the hazard; and
generate a virtual three-dimensional holographic safety gate around the machine based on the one or more safety precautions, wherein the generating the virtual three-dimensional holographic safety gate comprises sending instructions to plural projection units that project the virtual three-dimensional holographic safety gate.

8. The computer program product of claim 7, wherein:
a subset of the plural projection units are mobile units, and the instructions include instructions that cause each of the mobile units to move to a respective location and arrive at the respective location by or before an indicated time; and
the plural projection units cooperate with one another to create the virtual three-dimensional holographic safety gate by each of the plural projection units projecting respective portions of the virtual three-dimensional holographic safety gate.

9. The computer program product of claim 7, wherein the virtual three-dimensional holographic safety gate includes a visual indication of the one or more safety precautions.

10. The computer program product of claim 9, wherein the program instructions are executable to:
in response to determining a person approaching the virtual three-dimensional holographic safety gate does not have at least one of the one or more safety precautions, cause the virtual three-dimensional holographic safety gate to display a warning to the person, the warning indicating which of the one or more safety precautions the person is lacking.

11. The computer program product of claim 10, wherein the program instructions are executable to:
in response to detecting the person entered an area defined by the virtual three-dimensional holographic safety gate, generate an alert.

12. The computer program product of claim 7, wherein the program instructions are executable to:
define a buffer zone around an area defined by the virtual three-dimensional holographic safety gate;
stop generating the virtual three-dimensional holographic safety gate in response to determining that no people are within the area and the buffer zone; and
regenerate the virtual three-dimensional holographic safety gate in response to determining that a person entered the buffer zone.

13. A method, comprising:
determining, by a computing device, an operating condition of a machine in an industrial environment;
determining, by the computing device, a hazard based on the operating condition;
determining, by the computing device, one or more safety precautions based on the hazard; and
generating, by the computing device, a virtual three-dimensional holographic safety gate around the machine based on the one or more safety precautions.

14. The method of claim 13, wherein the generating the virtual three-dimensional holographic safety gate comprises sending instructions to plural projection units that project the virtual three-dimensional holographic safety gate.

15. The method of claim 14, wherein a subset of the plural projection units are mobile units, and the instructions include instructions that cause each of the mobile units to move to a respective location and arrive at the respective location by or before an indicated time.

16. The method of claim 13, wherein the virtual three-dimensional holographic safety gate includes a visual indication of the one or more safety precautions.

17. The method of claim 16, further comprising:
in response to determining a person approaching the virtual three-dimensional holographic safety gate does not have at least one of the one or more safety precautions, causing the virtual three-dimensional holographic safety gate to display a warning to the person, the warning indicating which of the one or more safety precautions the person is lacking.

18. The method of claim 17, further comprising:
in response to detecting the person entered an area defined by the virtual three-dimensional holographic safety gate, generating an alert.

19. The method of claim 1, further comprising:
defining a buffer zone around an area defined by the virtual three-dimensional holographic safety gate; and
stopping generating the virtual three-dimensional holographic safety gate in response to determining that no people are within the area and the buffer zone.

20. The method of claim 1, further comprising:
regenerating the virtual three-dimensional holographic safety gate in response to determining that a person entered the buffer zone.

\* \* \* \* \*